(12) United States Patent
Babin et al.

(10) Patent No.: US 7,614,869 B2
(45) Date of Patent: Nov. 10, 2009

(54) MANIFOLD NOZZLE CONNECTION FOR AN INJECTION MOLDING SYSTEM

(75) Inventors: Denis Babin, Georgetown (CA); Hans Guenther, Georgetown (CA); George Olaru, North York (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 227 days.

(21) Appl. No.: 11/746,054

(22) Filed: May 8, 2007

(65) Prior Publication Data

US 2008/0279978 A1 Nov. 13, 2008

(51) Int. Cl.
B29C 45/20 (2006.01)

(52) U.S. Cl. ........................ 425/549; 425/572
(58) Field of Classification Search .............. 425/549, 425/572
See application file for complete search history.

(56) References Cited

U.S. PATENT DOCUMENTS

| | | | |
|---|---|---|---|
| 2,770,011 A | 11/1956 | Kelly | |
| 3,113,346 A | 12/1963 | Bright | |
| 3,491,408 A | 1/1970 | Natkins | |
| 3,535,742 A | 10/1970 | Marcus | |
| 3,553,788 A | 1/1971 | Putkowski | |
| 3,822,856 A | 7/1974 | Gellert | |
| 4,212,624 A | 7/1980 | Ando et al. | |
| 4,344,750 A | 8/1982 | Gellert | |
| 4,345,892 A | 8/1982 | Schulte et al. | |
| 4,818,217 A | 4/1989 | Schmidt et al. | |
| 4,836,766 A | 6/1989 | Gellert | |
| 4,902,218 A | 2/1990 | Leonard et al. | |
| 4,981,431 A | 1/1991 | Schmidt | |
| 5,049,062 A | 9/1991 | Gellert | |
| 5,051,086 A | 9/1991 | Gellert | |
| 5,268,184 A | 12/1993 | Gellert | |
| 5,269,676 A | 12/1993 | Gellert | |
| 5,269,677 A | 12/1993 | Gauler | |
| 5,494,433 A | 2/1996 | Gellert | |
| 5,536,165 A | 7/1996 | Gellert | |

(Continued)

FOREIGN PATENT DOCUMENTS

CA 2441139 3/2005

(Continued)

OTHER PUBLICATIONS

D.M.E., "HTS Hot Runner Systems", Edge gate technology for Micromolding, (Dec. 2000),p. 1-4.

(Continued)

*Primary Examiner*—Tim Heitbrink
(74) *Attorney, Agent, or Firm*—Medler Ferro PLLC

(57) ABSTRACT

An injection molding system having a manifold nozzle connection that accommodates thermal expansion of the system. A manifold nozzle tubular connector is receivable at a first end within a manifold and at a second end within a nozzle and has a length that bridges a space between opposing surfaces of the manifold and nozzle. The first end of the tubular connector may be threadably and/or permanently attached within a manifold bore in a downstream surface of the manifold with the second end of the tubular connector being slidably received within a nozzle bore in an upstream surface of the nozzle or within a nozzle melt channel. Alternatively, the first end of the tubular connector may be slidably received within a manifold bore in the downstream surface of the manifold or within a manifold melt channel with the second end of the tubular connector being threadably and/or permanently attached within a nozzle bore in an upstream surface of the nozzle.

28 Claims, 11 Drawing Sheets

U.S. PATENT DOCUMENTS

| | | | |
|---|---|---|---|
| 5,591,465 A | 1/1997 | Babin | |
| 5,609,893 A | 3/1997 | Eastwood | |
| 5,720,995 A * | 2/1998 | Gellert | 425/572 |
| 5,780,077 A | 7/1998 | von Holdt | |
| 5,820,899 A | 10/1998 | Gellert et al. | |
| 5,952,016 A | 9/1999 | Gellert | |
| 6,666,675 B2 | 12/2003 | Ihara et al. | |
| 6,688,875 B2 * | 2/2004 | Babin | 425/549 |
| 6,805,549 B2 | 10/2004 | Gunther | |
| 6,835,060 B2 | 12/2004 | Sicilia | |
| 6,860,732 B2 | 3/2005 | Babin et al. | |
| 2004/0156944 A1 * | 8/2004 | Olaru | 425/569 |
| 2004/0197437 A1 | 10/2004 | Olaru | |
| 2005/0019444 A1 | 1/2005 | Sicilia et al. | |
| 2005/0196486 A1 | 9/2005 | Babin et al. | |

FOREIGN PATENT DOCUMENTS

| | | |
|---|---|---|
| DE | 7603206 | 6/1976 |
| DE | 3338783 | 3/1985 |
| DE | 3501840 | 7/1986 |
| DE | 4215601 | 11/1993 |
| DE | 4404894 | 1/1995 |
| DE | 10008722 | 8/2001 |
| DE | 10150419 | 5/2003 |
| DE | 10307989 | 9/2003 |
| EP | 070925 | 6/1981 |
| EP | 841142 | 11/1997 |
| JP | 51103151 | 9/1976 |
| JP | 5531604 U | 2/1980 |
| JP | 58-14728 | 1/1983 |
| JP | 1141017 U | 9/1989 |
| JP | 10166393 | 6/1998 |
| JP | 2004/330672 | 11/2004 |
| JP | 2005/041020 | 2/2005 |
| JP | 2005/132026 | 5/2005 |
| WO | WO 2007/051857 | 5/2007 |

OTHER PUBLICATIONS

Schottli, "Know-How", (Oct. 1997), p. 1-8.

* cited by examiner

MANIFOLD NOZZLE CONNECTION FOR AN INJECTION MOLDING SYSTEM

FIELD OF THE INVENTION

The invention relates generally to an injection molding system and, in particular, to a connection between a hot runner manifold and nozzle of the system.

BACKGROUND OF THE INVENTION

In a multi-cavity injection molding apparatus having a hot runner manifold for delivering a melt stream of moldable material to a plurality of hot runner nozzles, the heat distribution throughout the manifold is typically uneven. This uneven heat distribution causes the manifold to warp. As a result, the distance between the lower surface of the manifold and each of a plurality of mold cavities varies and thus each nozzle is subjected to unique operating conditions depending on the nozzle's location relative to the manifold. As such, the thermal expansion results in a variable sealing force being applied to both the interface between the nozzle and manifold and the nozzle and mold gate. If the manifold "floats" where a head of the nozzle is in contact with the lower surface of the manifold but not attached to it, an uneven sealing condition may allow the pressurized melt to leak at the interface between the manifold and each nozzle and/or in the mold gate area around the nozzle seals. If the nozzles are threaded into the manifold, an uneven sealing condition may still allow the pressurized melt to leak in the mold gate area.

Edge gating from a nozzle of an injection molding apparatus through a number of edge gate seals is well known. A multi-cavity edge, or side, gated injection molding apparatus 100 is shown in FIG. 1 that is described in U.S. Pat. No. 5,494,433 to Gellert, issued Feb. 27, 1996, which is incorporated by reference herein in its entirety. Generally, the multi-cavity edge-gated injection molding apparatus 100 includes several nozzles 102, one of which is shown in FIG. 1, that are coupled to a hot runner manifold 118 to receive a melt stream of moldable material therefrom.

Each nozzle 102 is mounted in an opening 104 in a mold plate 106. Nozzle 102 includes a nozzle melt channel 108 for receiving the melt stream from a manifold melt channel 132 and delivering the melt stream to mold cavities 112 via mold gates 110. Nozzle 102 includes a nozzle heater 126 that is monitored and controlled by a thermocouple 128, and manifold 118 includes a manifold heater 130. Nozzle heater 126 and manifold heater 130 are provided to maintain the melt stream of moldable material within melt channels 108, 132, respectively, at a proper processing temperature.

Mold cavities 112 are formed between respective cavity inserts 154 and mold cores 156. Cavity insert 154 is disposed within mold plate 106 and includes seals 150 and cooling channels 152 there between. Each mold core 156 is held in place by a mold insert 158. Mold cavities 112 are radially spaced around nozzle 102 with each mold gate 110 extending through a gate insert 114 that is held in position by a gate insert retainer plate 122 and mold insert 158. Each mold gate 110 is aligned with a gate seal 116 that is threadably coupled to a downstream end of nozzle 102. As such, the location of gate seals 116 is generally fixed relative to mold plate 106.

As illustrated in FIG. 1, manifold 118 is a "floating" manifold that is positioned below a back plate 120 and coupled to nozzle 102 such that manifold 118 does not contact mold plate 105. This arrangement allows for thermal expansion of manifold 118 and nozzle 102 in an axial direction. In such an arrangement, requisite axial thermal expansion of manifold 118 is accommodated by having a sliding/telescopic arrangement between manifold 118 and a sprue bushing 124 fixed to back plate 120. However, axial thermal expansion of nozzle 102 is restricted in a direction of mold cavities 112 by the relatively fixed position of gate seals 116. Consequently, gate seals 116 may bear the load of both manifold 118 and edge-gating nozzle 102 during operation of injection molding apparatus 100. Due to the strenuous and repetitive nature of the injection molding process, such a load condition may cause misalignment of gate seals 116 with their respective mold gates 110 and/or excessive wear of gate seals 116 resulting in leakage and more frequent repair and maintenance.

What is needed is an improved connection between a hot runner manifold and a nozzle that accommodates thermal expansion of the nozzle and some deflection of the manifold without causing a variable or excessive force being applied between the nozzle and the manifold or the nozzle and a mold gate of an injection molding system.

BRIEF SUMMARY OF THE INVENTION

Embodiments of the present invention are directed toward injection molding systems having a manifold-nozzle connection that accommodates thermal expansion of the system under an operating condition.

Certain embodiments are directed to an injection molding system having a manifold for delivering a melt stream of moldable material to a nozzle having a plurality of nozzle tips radially extending from a downstream end thereof such that each nozzle tip is in fluid communication with a respective mold cavity. A tubular connector device is provided that has a melt channel for receiving the melt stream from a manifold melt channel and delivering the melt stream to a nozzle melt channel. The tubular connector device includes a first end for positioning within a downstream bore of the manifold and a second end for positioning within an upstream bore of the nozzle, wherein one of the first and second ends of the tubular connector is threaded. The tubular connector is of a length that bridges a space between the manifold and nozzle.

Other embodiments of the present invention are directed to an injection molding system having a manifold for delivering a melt stream of moldable material to a nozzle having a plurality of nozzle tips radially extending from a downstream end thereof such that each nozzle tip is in fluid communication with a respective mold cavity. A tubular connector device is provided that has a melt channel for receiving the melt stream from a manifold melt channel and delivering the melt stream to a nozzle melt channel. The tubular connector device includes a first end for positioning within the manifold and a second end for positioning within the nozzle, wherein one of the first and second ends of the tubular connector device is slidable within one of the manifold and nozzle melt channels. The tubular connector is of a length that bridges a space between the manifold and nozzle.

Other embodiments of the present invention are directed to an injection molding system having a manifold for delivering a melt stream of moldable material to a nozzle, wherein the nozzle includes a tubular projection extending from an upstream surface thereof that is slidably received within the manifold and is of a length that bridges a space between the manifold and the nozzle.

Injection molding systems according to embodiments of the present invention may include one ore more nozzle heaters and/or one or more thermocouples attached to the nozzles to achieve the requisite operating parameters for the particular injection molding process. Nozzles for use in injection molding systems according to embodiments of the present invention may include first and second nozzle portions that are attached or secured together or may include a first nozzle and a second nozzle attached or secured together.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Specific embodiments of the present invention are now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention.

Figure 1:
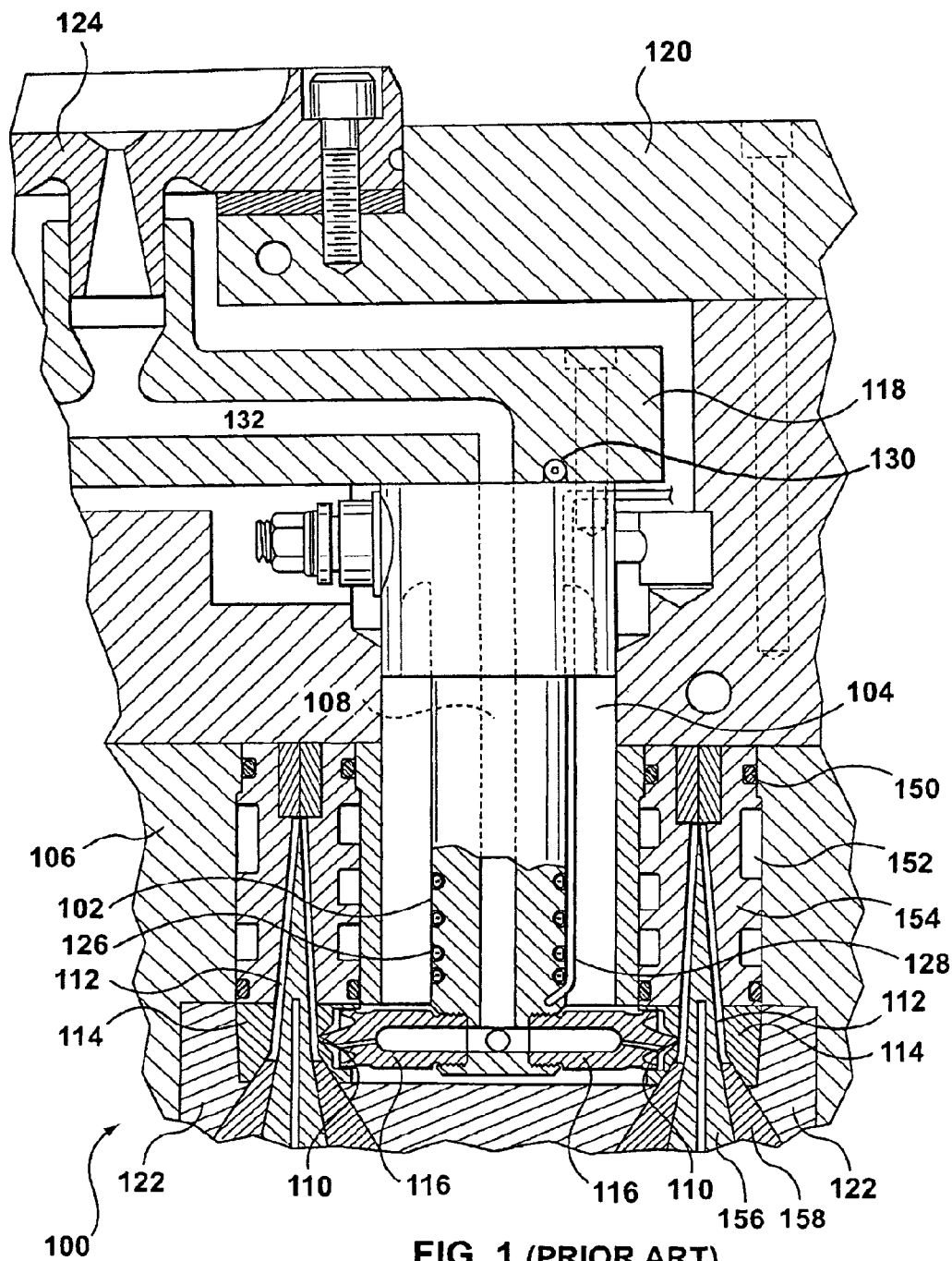
FIG. 1 is a partial cross-sectional view of a conventional edge-gated injection molding apparatus.
Figure 2:
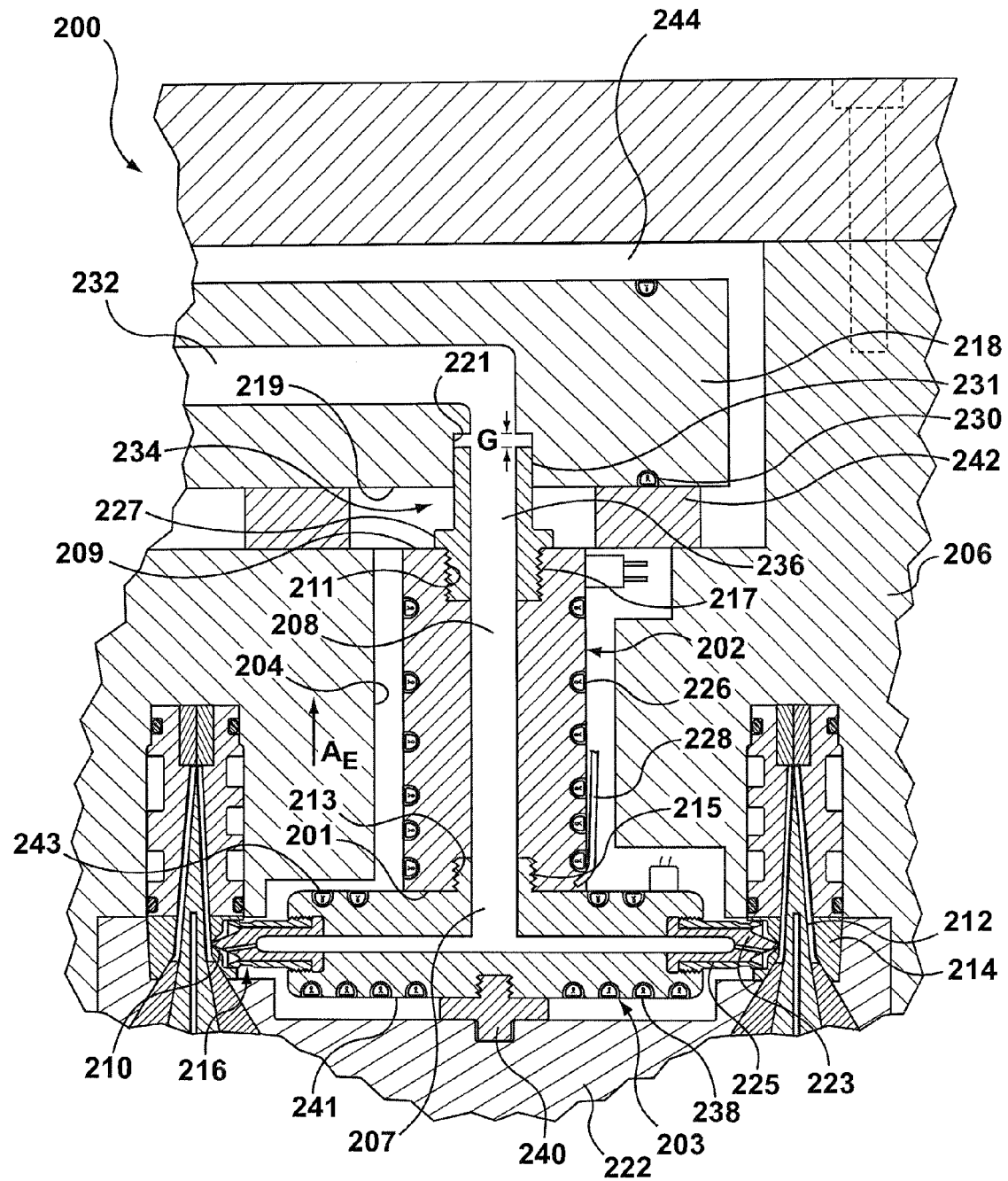
FIG. 2 is a cross-sectional view of an injection molding apparatus according to an embodiment of the present invention.

An edge gated injection molding apparatus 200 according to an embodiment of the present invention is shown in FIG. 2. Injection molding apparatus 200 includes a first nozzle 202 having a first nozzle melt channel 208 and a second nozzle 203 having a second nozzle melt channel 207. However, as in the embodiment of FIG. 7 described below, first and second nozzles 202, 203 may be considered a two-part nozzle having first and second nozzle portions 202, 203 without departing from the scope of the present invention.

A downstream end 201 and an upstream end 209 of first nozzle 202 include threaded bores 213, 211. Threaded bore 213 in downstream end 201 of first nozzle 202 receives a threaded end 215 of second nozzle 203 to permit second nozzle 203 to be threadably coupled to first nozzle 202, whereby first nozzle melt channel 208 is in fluid communication with second nozzle melt channel 207. Threaded bore 211 in upstream end 209 of first nozzle 202 receives a threaded downstream end 217 of a manifold nozzle link, or tubular connector device, 234 to permit manifold nozzle link 234 to be threadably coupled to first nozzle 202, whereby a manifold nozzle link melt channel 236 is in fluid communication with first nozzle melt channel 208. In various embodiments of the present invention, manifold nozzle link 234 may be formed from a material having good thermal conductivity, for e.g., copper alloys, particularly beryllium copper alloys, certain grades of steel and stainless steel, and/or may be formed from a material having good wear and corrosion resistance as would be beneficial in certain applications. Manifold nozzle link 234 includes a radial projection 227 that may be gripped for engaging manifold nozzle link 234 into threaded bore 213. In addition, radial projection 227 may act as a stop to prevent over tightening of manifold nozzle link 234 within threaded bore 213.

In various embodiments, first nozzle 202 may be of a longer or shorter length as may be suitable for a particular injection molding application. In addition, second nozzle 203 may be a front mountable nozzle having a substantially puck-like shape, as shown in FIG. 2, or may be another suitable shape, such as polygonal, depending on the injection molding application in which it is to be utilized.

A manifold 218 includes a manifold melt channel 232 for receiving a melt stream of moldable material from a melt source (not shown) and delivering the melt stream to first nozzle melt channel 208 via melt channel 236 of manifold nozzle link 234. A downstream surface 219 of manifold 218 includes a bore 221 for slidably receiving a slidable upstream end 231 of manifold nozzle link 234. Manifold nozzle link 234 sits within bore 221 such that manifold melt channel 232 substantially aligns with manifold nozzle link melt channel 236 and is of a length sufficient to bridge a space or distance between manifold 218 and first nozzle 202. In FIG. 2, injection molding system 200 is shown in a non-operating, cold condition with a gap "G" shown between an upper surface of manifold nozzle link 234 and an opposing surface of manifold bore 221. Gap "G" is sized to accommodate thermal expansion of injection molding system 200 during operation.

Downstream surface 219 of manifold 218 is spaced from upstream surface 209 of first nozzle 202 by a spacer member 242. Spacer member 242 maintains a distance or space between manifold 218 and first nozzle 202, such that manifold 218 and nozzle 202 do not touch in hot or cold conditions, i.e., in operating or non-operating conditions. Accordingly, spacer member 242 bridges insulative air space 244 that surrounds manifold 218 and, in an embodiment, may be a pressure disk as disclosed in U.S. Pat. No. 5,125,827 to Gellert, which is incorporated by reference herein in its entirety. In various embodiments, spacer member or pressure disk 242 may be relatively flexible to absorb some of the heat expansion force, or may be relatively rigid to simply maintain the space between manifold 218 and first nozzle 202 without substantially flexing to accommodate the heat expansion force.

Each of first and second nozzles 202, 203 is mounted in an opening 204 in a mold plate 206 with a locator device 240 positioned between a lower surface 241 of second nozzle 203 and a gate insert retainer plate 222. A plurality of two-piece nozzle seals 216 having a nozzle tip 223 secured to a side surface of second nozzle 203 by a tip retainer 225 are shown in the embodiment of FIG. 2. Although nozzle seals 216 are shown extending directly from, or in-line with, the radially extended portion of second nozzle melt channel 207 and normal to the side surface of second nozzle 203, it should be understood that nozzle seals 216 may extend at any angle from the radially extended portion of second nozzle melt channel 207 and/or the side or forward surface of second nozzle 203. An exemplary two-piece nozzle seal arrangement that may be used in embodiments of the present invention is disclosed in U.S. Pat. No. 5,299,928 to Gellert, which is incorporated by reference herein in its entirety. A respective nozzle tip 223 conveys melt from a radially extending portion of second nozzle melt channel 207 to a mold cavity 212 via a mold gate 210, wherein each mold gate 210 extends through a gate insert 214 that is held in position by gate insert retainer plate 222. Tip retainer 225 contacts gate insert 214 to seal against melt leakage around mold gate 210. Locator device 240 aids in maintaining alignment of nozzle tips 223 and mold gates 210 during operation. Locator device 240 assures a proper height of nozzle tips 223 with respect to mold gates 210 to permit proper centering thereof.

Manifold 218, first nozzle 202 and second nozzle 203 each have independent heaters 230, 226, and 238, respectively, that provide heat to the melt stream within melt channels 232, 208 and 207. First nozzle heater 226 may be a wire element heater as shown in FIG. 2, which may be embedded within or simply wrapped around first nozzle 202. Other suitable nozzle heater, such as a band or cartridge heater, may also be used without departing from the scope of the present invention. Second nozzle heater 238 is shown wrapped around an upper surface 243 and lower surface 241 of second nozzle 203 to provide second nozzle melt channel 207 and nozzle seals 216 with heat. However in various embodiments, second nozzle heater 238 may be provided on only one of upper surface 243 and lower surface 241 of second nozzle 203. At least one thermocouple 228 monitors the operating temperature of injection molding apparatus 200 and regulates operation of one or more of heaters 230, 226 and 228 to achieve the desired operating parameters.

During operation, thermal expansion in an axial direction of manifold 218 and first and second nozzles 202, 203 is provided for by the gap "G" between manifold nozzle link 234 and manifold bore 221. In such an arrangement, requisite axial thermal expansion is accommodated by having a sliding/telescopic arrangement between manifold 218 and manifold nozzle link 234, which is fixed to and moves in unison with first nozzle 202 and second nozzle 203. Axial thermal expansion of first nozzle 202 and second nozzle 203 is restricted in a direction of mold cavities 212 by locator 240, such that thermal expansion of first and second nozzles 202, 203 occurs substantially in the direction of arrow AE in FIG. 2. Consequently, nozzle seals 216 do not bear the load of both manifold 218 and first and second nozzles 201, 203 during operation of injection molding apparatus 200. Another feature of utilizing manifold nozzle link 234 in this manner is that it allows front mounting of both first and second nozzles 202, 203.

Figure 3:
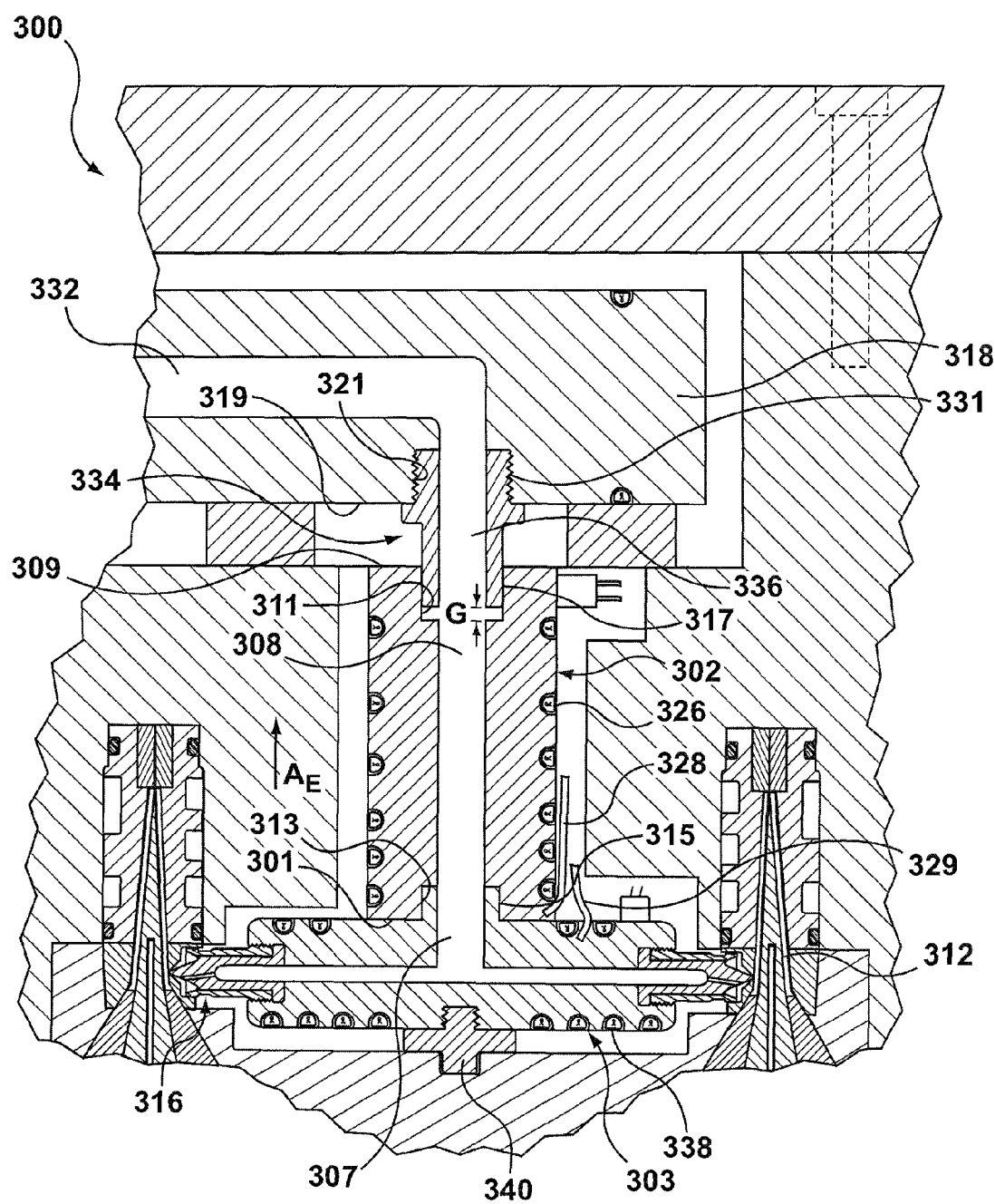
FIG. 3 is a cross-sectional view of an injection molding apparatus according to another embodiment of the present invention.

FIG. 3 is a cross-sectional view of an injection molding apparatus 300 according to another embodiment of the present invention. Injection molding apparatus 300 includes first nozzle 302 having first nozzle melt channel 308 and second nozzle 303 having second nozzle melt channel 307. However, as in the embodiment of FIG. 7 described below, first and second nozzles 302, 303 may be considered a two-part nozzle having first and second nozzle portions 302, 303 without departing from the scope of the present invention.

Downstream end 301 and upstream end 309 of first nozzle 302 include bores 313, 311. Bore 313 in downstream end 301 of first nozzle 302 slidably receives a tubular projection 315 of second nozzle 303 to permit second nozzle 303 to be permanently coupled to first nozzle 302, such as by brazing, soldering, or shrink fitting, or removably coupled to first nozzle 302, such as by press fitting. When first and second nozzles 302, 303 are in engagement with one and other, first nozzle melt channel 308 is in fluid communication with second nozzle melt channel 307. Bore 311 in upstream end 309 of first nozzle 302 receives a slidable downstream end 317 of manifold nozzle link or seal 334 to permit manifold nozzle link 334 to be slidably engaged with first nozzle 302, whereby a manifold nozzle link melt channel 336 is in fluid communication with first nozzle melt channel 308. In FIG. 3, injection molding system 300 is shown in a non-operating, cold condition with a gap "G" shown between the downstream surface of manifold nozzle link 334 and an opposing surface of nozzle bore 311. Gap "G" is sized to accommodate thermal expansion of injection molding system 300 during operation, which for first and second nozzles 302, 303 occurs substantially in the direction of arrow AE in FIG. 3.

Hot runner injection molding manifold 318 includes a manifold melt channel 332 for receiving a melt stream of moldable material from a melt source (not shown) and delivering the melt stream to first nozzle melt channel 308 via melt channel 336 of manifold nozzle link 334. A downstream surface 319 of manifold 318 includes a threaded bore 321 for threadably receiving a threaded upstream end 331 of manifold nozzle link 334.

Injection molding apparatus 300 includes a first and second thermocouple 328, 329 for monitoring and controlling first and second nozzle heaters 326, 338, respectively. During operation, thermal expansion in an axial direction of manifold 318 and first and second nozzles 302, 303 is provided for by the gap "G" between manifold nozzle link 334 and upstream bore 311 of first nozzle 302. In such an arrangement, requisite axial thermal expansion is accommodated by having a sliding/telescopic arrangement between first and second nozzles 302, 303 and manifold nozzle link 334, which is fixed to and moves in unison with manifold 318. Axial thermal expansion of first nozzle 302 and second nozzle 303 is restricted in a direction of mold cavities 312 by locator 340. Consequently, nozzle seals 316 do not bear the load of both manifold 318 and first and second nozzles 301, 303 during operation of injection molding apparatus 300.

All other features of injection molding apparatus 300 that are shown in FIG. 3 but not particularly described with respect to injection molding apparatus 300 are similar to the same or similar features shown and described with reference to injection molding apparatus 200 of FIG. 2.

Figure 4:
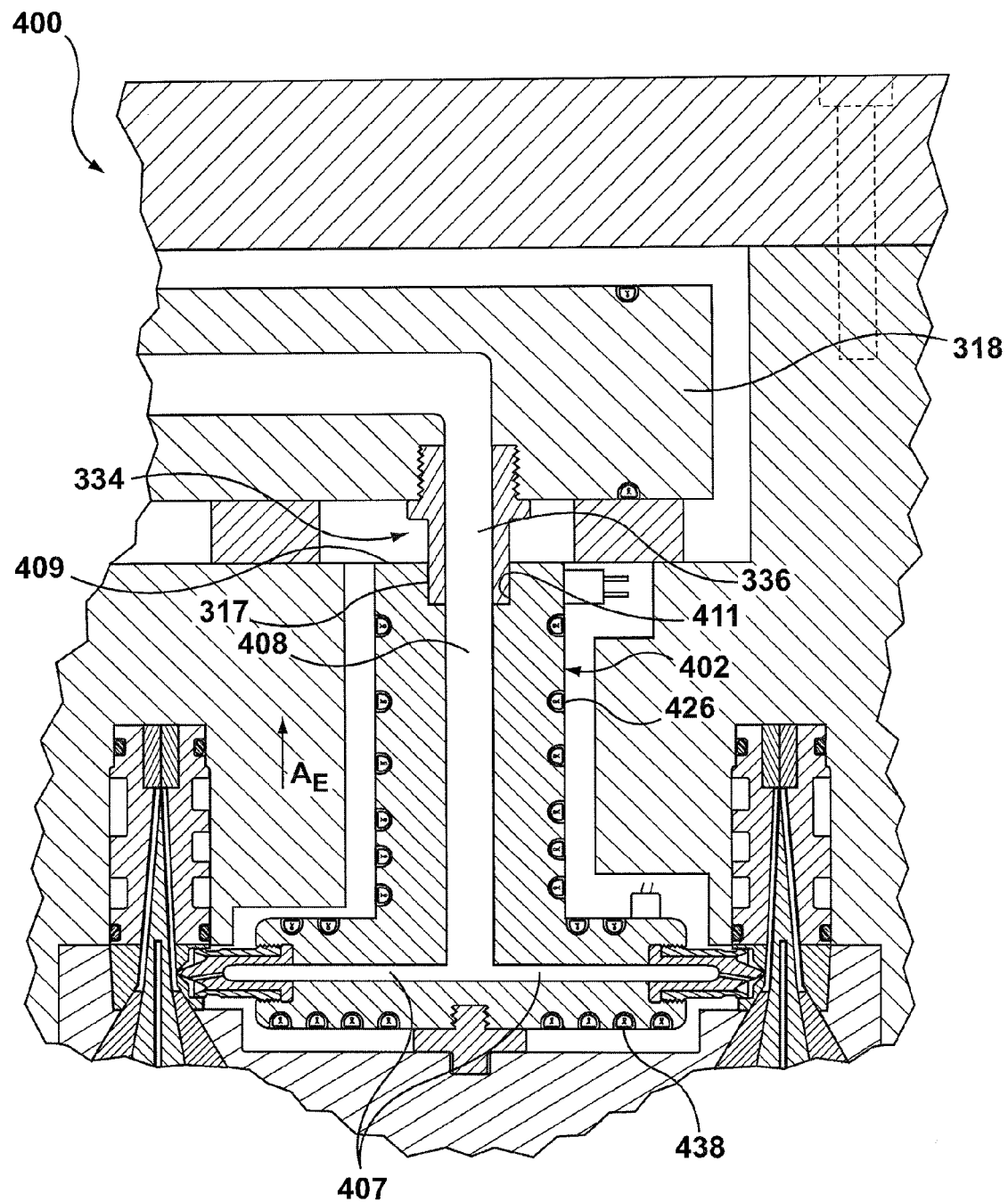
FIG. 4 is a cross-sectional view of an injection molding apparatus according to another embodiment of the present invention.

An edge gated injection molding apparatus 400 according to another embodiment of the present invention is shown in FIG. 4. Injection molding apparatus 400 includes manifold 318 and manifold nozzle link 334 connected as described with reference to injection molding apparatus 300 of FIG. 3. However, nozzle 402 of injection molding apparatus 400 is a single, unitary structure having a first melt channel 408 that branches to a plurality of second melt channels 407. An upstream surface 409 of nozzle 402 includes an upstream bore 411 that receives a slidable downstream end 317 of manifold nozzle link 334 to permit manifold nozzle link 334 to be slidably engaged with nozzle 402, whereby manifold nozzle link melt channel 336 is in fluid communication with nozzle melt channel 408. In FIG. 4, injection molding system 400 is shown in an operating or hot condition such that the gap "G" shown in FIG. 3 is closed between the downstream surface of manifold nozzle link 334 and an opposing surface of nozzle bore 411, thereby accommodating the thermal expansion of injection molding system 400.

Figure 5:
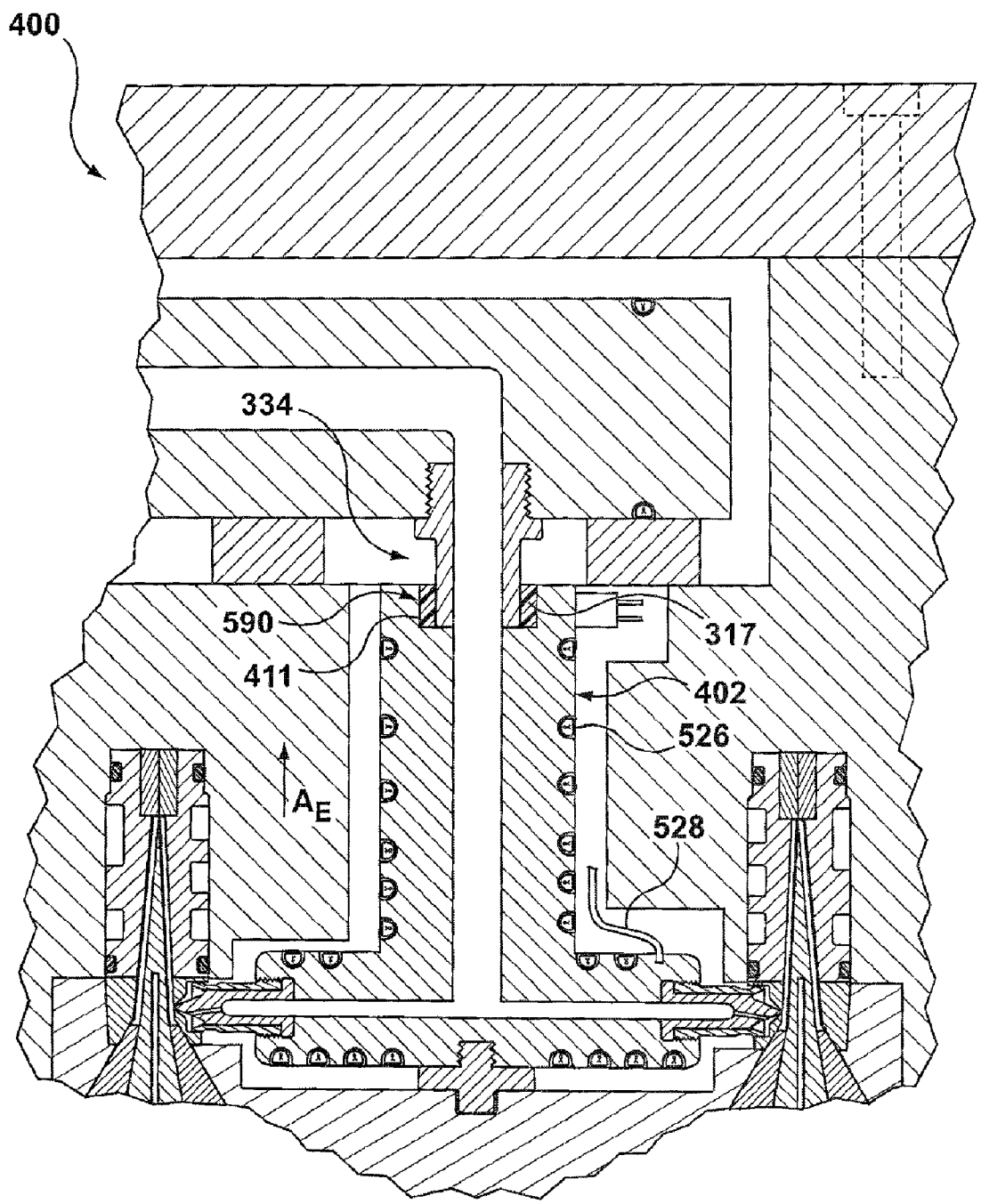
FIG. 5 is a cross-sectional view of an injection molding apparatus according to another embodiment of the present invention.
Figure 6:
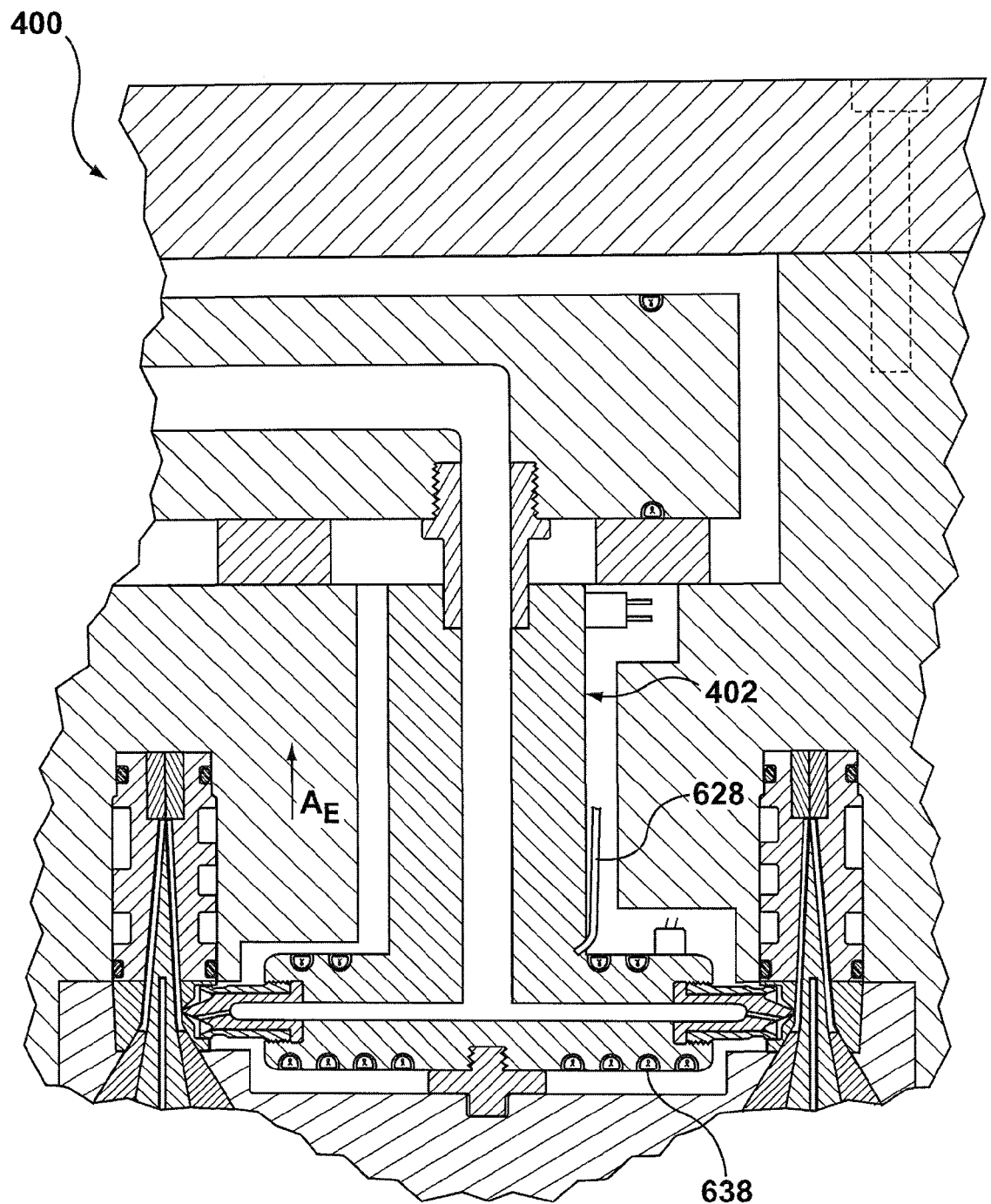
FIG. 6 is a cross-sectional view of an injection molding apparatus according to another embodiment of the present invention.

Injection molding apparatus 400 includes independent first and second nozzle heaters 426, 438 that are wound around upper and lower portions of nozzle 402, respectively. Heaters 426, 438 may be operated by a single thermocouple, as in the embodiment of FIG. 2, or by a dedicated thermocouple for each, as shown in the embodiment of FIG. 3. FIG. 5 illustrates an alternate configuration of injection molding apparatus 400 also in an operating condition, wherein one piece nozzle 402 may be fitted with a single embedded heater 526 that is wound around both the upper and lower portions of nozzle 402 and is controlled by thermocouple 528. An annular insert 590 is fitted within nozzle bore 411 to encircle downstream end 317 of manifold nozzle link 334 to provide a seal between the two components. Annular insert 590 may be made of a more wear resistant material than nozzle 402 and/or have a greater or lesser coefficient of thermal expansion than the material of nozzle link 334 depending on the injection molding application. In this manner, annular insert 590 accommodates sliding movement of manifold nozzle link 334. FIG. 6 illustrates still another configuration of injection molding apparatus 400 also in an operating condition, wherein one piece nozzle 402 is fitted with a single embedded heater 638 wound around only the lower portion of nozzle 402 and controlled by thermocouple 628. All other features of injection molding apparatus 400 that are shown in FIGS. 4, 5 and 6 but not particularly described with respect to injection molding apparatus 400 are similar to the same or similar features shown and described with reference to previous embodiments of the present invention.

Figure 7:
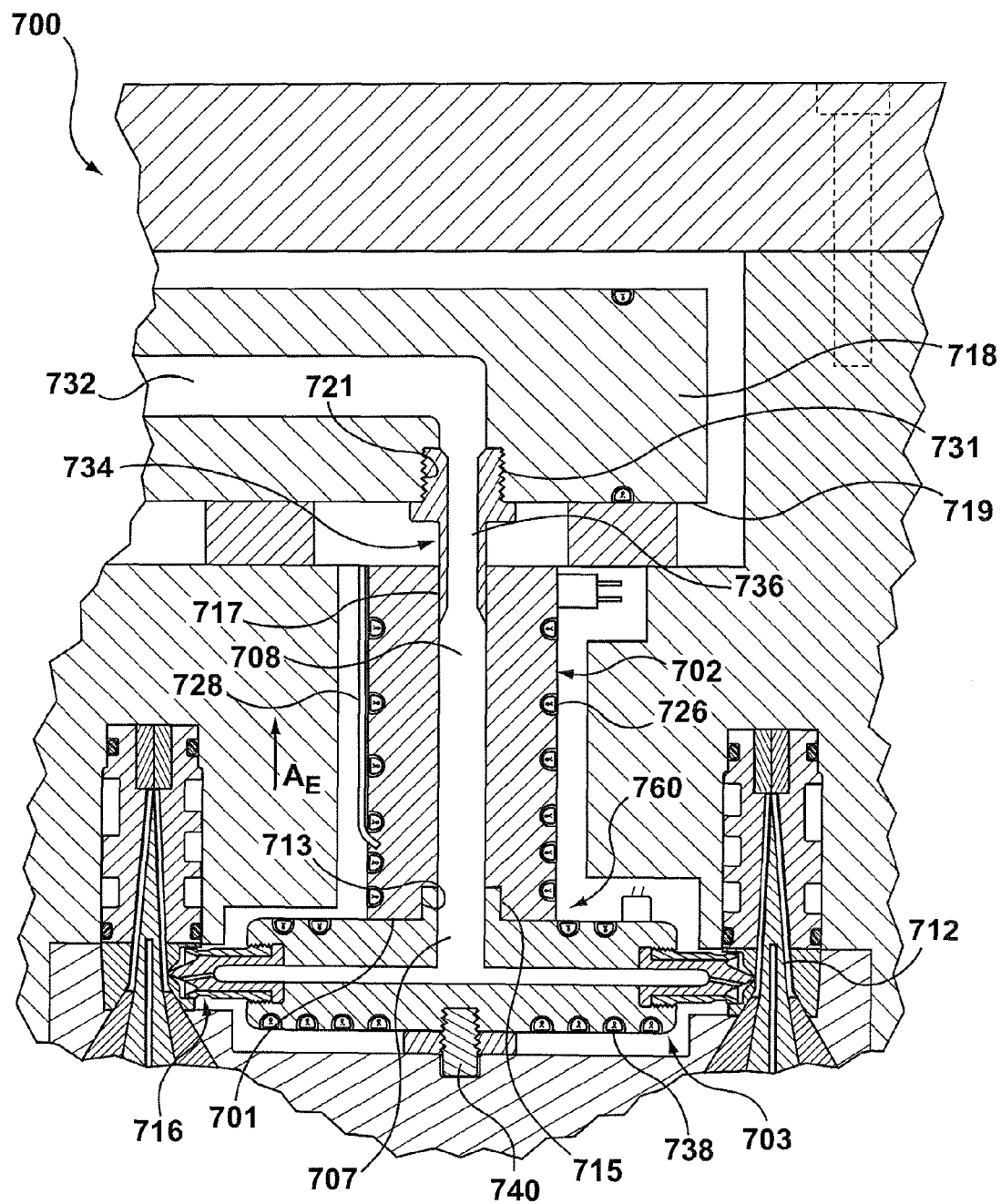
FIG. 7 is a cross-sectional view of an injection molding apparatus according to another embodiment of the present invention.

FIG. 7 is a cross-sectional view of an injection molding apparatus 700 according to another embodiment of the present invention. Injection molding apparatus 700 includes a two-part nozzle 760 having a first nozzle portion 702 having a first melt channel 708 and a second nozzle portion 703 having a second melt channel 707. Downstream end 701 of first nozzle portion 702 includes bore 713 for receiving a tubular projection 715 of second nozzle portion 703 that permits second nozzle portion 703 to be permanently coupled to first nozzle portion 702, such as by brazing, soldering, or shrink fitting, or removably coupled to first nozzle 702, such as by press fitting, to thereby form two-part nozzle 760. When first and second nozzle portions 702, 703 are in engagement with one and other, first melt channel 708 is in fluid communication with second melt channel 707. An upstream portion of first melt channel 708 of first nozzle portion 702 receives a slidable downstream end 717 of manifold nozzle link 734 to permit manifold nozzle link 734 to be slidably engaged with first nozzle portion 702, whereby manifold nozzle link melt channel 736 is in fluid communication with first melt channel 708.

Manifold 718 includes manifold melt channel 732 for receiving a melt stream of moldable material from a melt source (not shown) and delivering the melt stream to first melt channel 708 via melt channel 736 of manifold nozzle link 734. A downstream surface 719 of manifold 718 includes threaded bore 721 for threadably receiving a threaded upstream end 731 of manifold nozzle link 734. Alternatively, threaded upstream end 731 of manifold nozzle link 734 may be permanently brazed within threaded bore 721 of manifold 718.

Injection molding apparatus 700 includes a thermocouple 728 for monitoring and controlling first and second heaters 726, 738, respectively. During operation, thermal expansion in an axial direction of manifold 718 and first and second nozzle portions 702, 703 is accommodated by having downstream end 717 of manifold nozzle link 734 in a sliding/telescopic arrangement within first melt channel 708 of first nozzle 702. Axial thermal expansion of first nozzle portion 702 and second nozzle portion 703 is restricted in a direction of mold cavities 712 by a two-piece locator 740, such that thermal expansion of first and second nozzle portions 702, 703 occurs substantially in the direction of arrow AE in FIG. 7. Consequently, two-piece nozzle seals 716 do not bear the load of both manifold 718 and first and second nozzle portions 701, 703 during operation of injection molding apparatus 700.

All other features of injection molding apparatus 700 that are shown in FIG. 7 but not particularly described with respect to injection molding apparatus 700 are similar to the same or similar features shown and described with reference to previous embodiments of the present invention.

Figure 8:
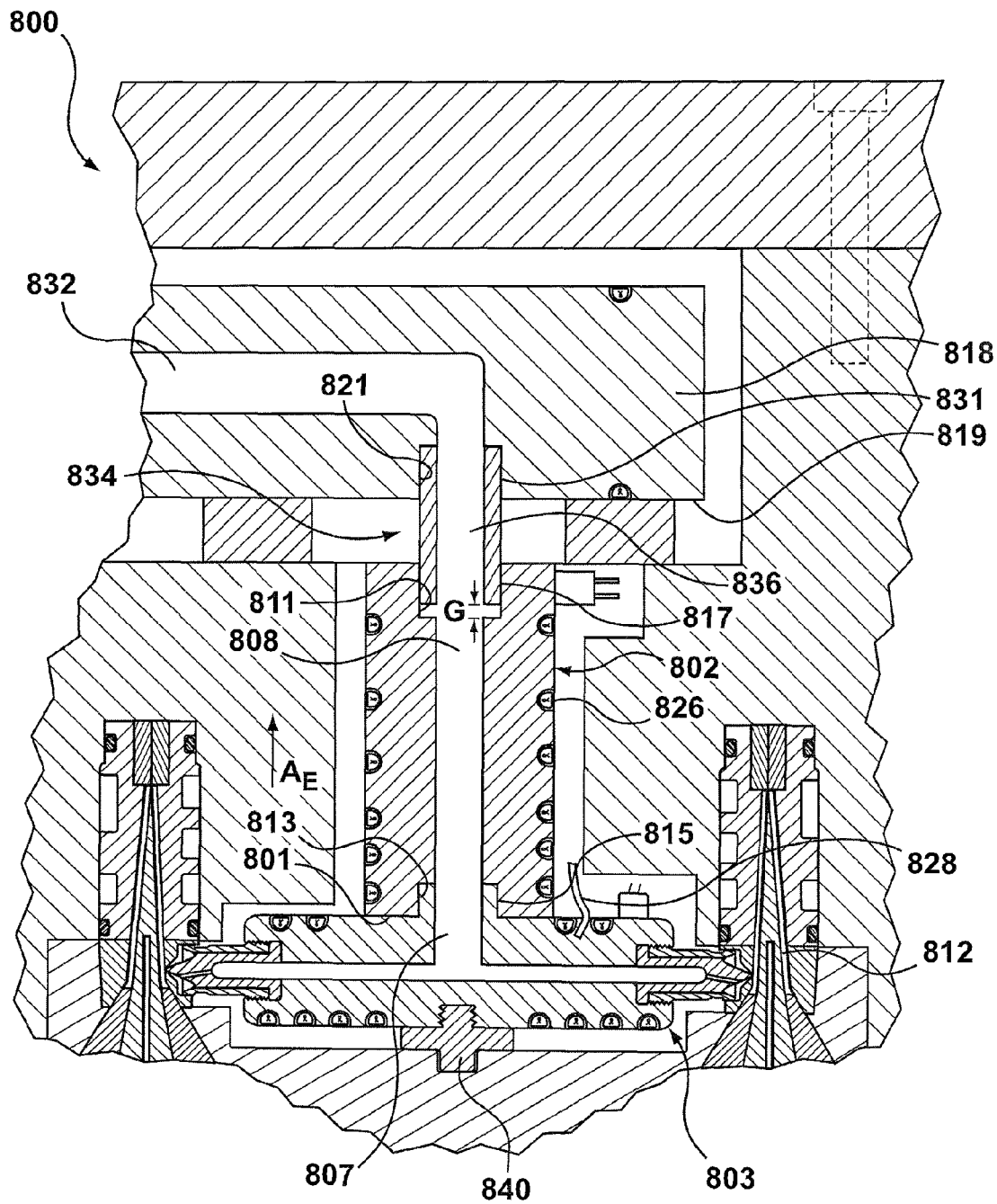
FIG. 8 is a cross-sectional view of an injection molding apparatus according to another embodiment of the present invention.

FIG. 8 is a cross-sectional view of an injection molding apparatus 800 according to another embodiment of the present invention. Injection molding apparatus 800 includes first nozzle 802 having first nozzle melt channel 808 and second nozzle 803 having second nozzle melt channel 807. However, as in the embodiment of FIG. 7, first and second nozzles 802, 803 may be considered a two-part nozzle having first and second nozzle portions 802, 803 without departing from the scope of the present invention.

Downstream end 801 and upstream end 809 of first nozzle 802 include bores 813, 811. Bore 813 in downstream end 801 of first nozzle 802 slidably receives a tubular projection 815 of second nozzle 803 to permit second nozzle 803 to be permanently coupled to first nozzle 802, such as by brazing, soldering, or shrink fitting, or removably coupled to first nozzle 802, such as by press fitting. When first and second nozzles 802, 803 are in engagement with one and other, first nozzle melt channel 808 is in fluid communication with second nozzle melt channel 807. Bore 811 in upstream end 809 of first nozzle 802 receives a slidable downstream end 817 of manifold nozzle link 834 to permit manifold nozzle link 834 to be slidably engaged with first nozzle 802, whereby a manifold nozzle link melt channel 836 is in fluid communication with first nozzle melt channel 808.

Hot runner injection molding manifold 818 includes manifold melt channel 832 for receiving a melt stream of moldable material from a melt source (not shown) and delivering the melt stream to first nozzle melt channel 808 via melt channel 836 of manifold nozzle link 834. A downstream surface 819 of manifold 818 includes a bore 821 for slidably receiving an upstream end 831 of manifold nozzle link 834. In FIG. 8, injection molding system 800 is shown in a non-operating, cold condition with a gap "G" shown between the downstream surface of manifold nozzle link 834 and an opposing surface of nozzle bore 811. Alternatively, gap "G" may be provided for between the upstream surface of manifold nozzle link 834 and an opposing surface of manifold bore 821, or further, split between the two interfaces. As in previous embodiments, gap "G" is sized to accommodate thermal expansion of injection molding system 800 during operation.

Injection molding apparatus 800 includes thermocouple 828 for monitoring and controlling first and second nozzle heaters 826, 838, respectively. During operation, thermal expansion in an axial direction of manifold 818 and first and second nozzles 802, 803 is provided for by the gap "G" between manifold nozzle link 834 and upstream bore 811 of first nozzle 802 and/or manifold bore 821. In such an arrangement, requisite axial thermal expansion is accommodated by having a sliding/telescopic arrangement between manifold nozzle link 834 and both manifold 818 and first nozzle 802. Axial thermal expansion of first nozzle 802 and second nozzle 803 is restricted in a direction of mold cavities 812 by locator 840, such that thermal expansion of first and second nozzles 802, 803 occurs substantially in the direction of arrow AE in FIG. 8. Consequently, nozzle seals 816 do not bear the load of both manifold 818 and first and second nozzles 801, 803 during operation of injection molding apparatus 800.

All other features of injection molding apparatus 800 that are shown in FIG. 8 but not particularly described with respect to injection molding apparatus 800 are similar to the same or similar features shown and described with reference to previous embodiments of the present invention.

Figure 9:
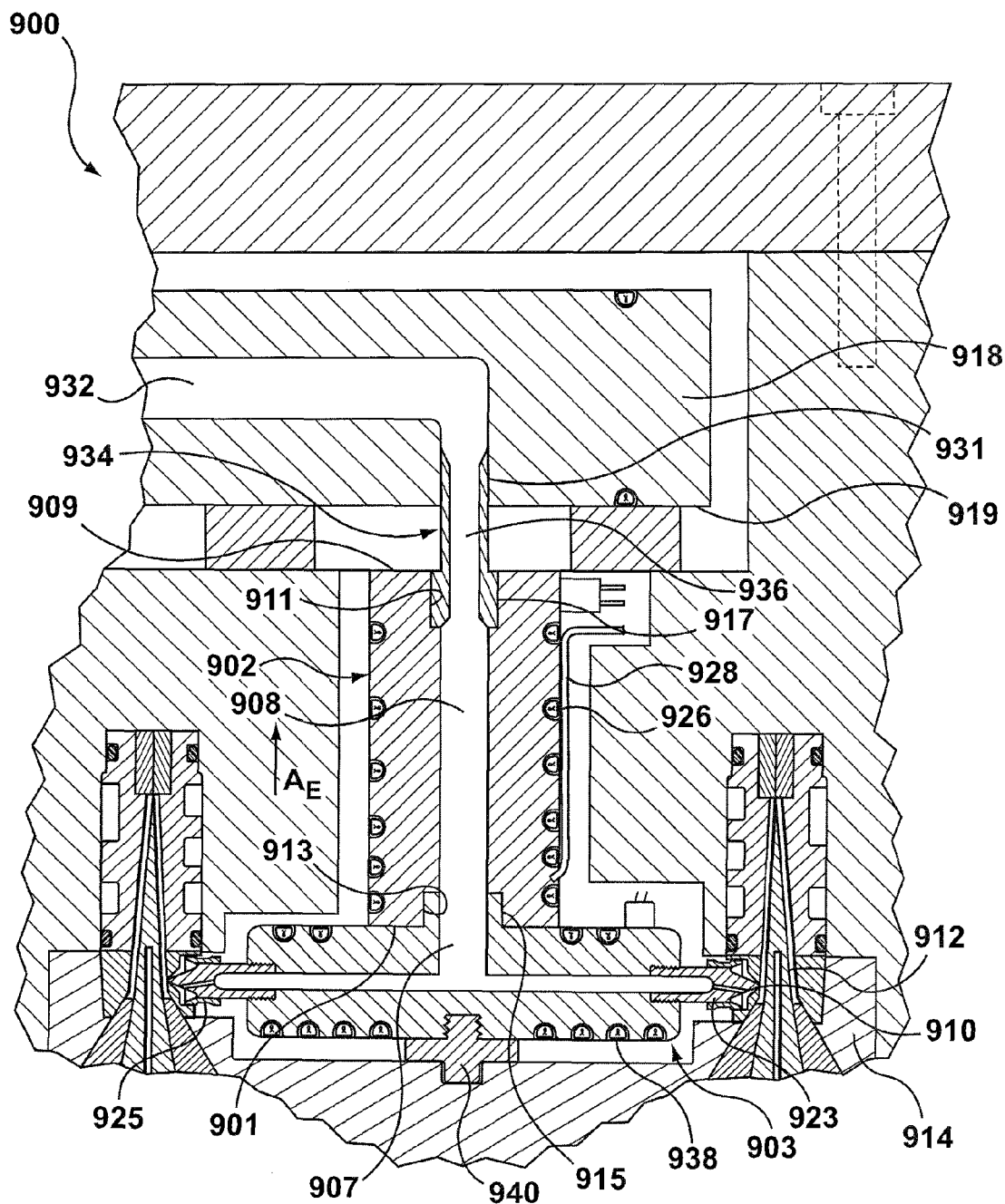
FIG. 9 is a cross-sectional view of an injection molding apparatus according to another embodiment of the present invention.

FIG. 9 is a cross-sectional view of an injection molding apparatus 900 according to another embodiment of the present invention. Injection molding apparatus 900 includes first nozzle 902 having first nozzle melt channel 908 and second nozzle 903 having second nozzle melt channel 907. However, as in the embodiment of FIG. 7, first and second nozzles 902, 903 may be considered a two-part nozzle having first and second nozzle portions 902, 903 without departing from the scope of the present invention.

Downstream end 901 and upstream end 909 of first nozzle 902 include bores 913, 911. Bore 913 in downstream end 901 of first nozzle 902 slidably receives a tubular projection 915 of second nozzle 903 to permit second nozzle 903 to be permanently coupled to first nozzle 902, such as by brazing, soldering, or shrink fitting, or removably coupled to first nozzle 902, such as by press fitting. When first and second nozzles 902, 903 are in engagement with one and other, first nozzle melt channel 908 is in fluid communication with second nozzle melt channel 907. Bore 911 in upstream end 909 of first nozzle 902 receives a downstream end 917 of manifold nozzle link 934 that is brazed therein. When manifold nozzle link 934 is attached to first nozzle 902, manifold nozzle link melt channel 936 is in fluid communication with first nozzle melt channel 908.

Manifold 918 includes manifold melt channel 932 for receiving a melt stream of moldable material from a melt source (not shown) and delivering the melt stream to first nozzle melt channel 908 via melt channel 936 of manifold nozzle link 934. Upstream end 931 of manifold nozzle link 934 is slidingly received within manifold melt channel 932.

Injection molding apparatus includes nozzle tips 923 for conveying melt from radially extending portions of second nozzle melt channel 907 to mold cavities 912 via respective mold gates 910. Nozzle tips 923 are secured, for example by threads, to the lateral surface of second nozzle 903. Seals 925 are situated between nozzle tips 923 and gate insert 914 to seal against melt leakage around mold gates 910, as well as in some instance to insulate nozzle tip 923 from heat loss. Seals 925 may be attached to nozzle tips 923 by threads or brazing. Locator device 940 aids in maintaining alignment of nozzle tips 923 and mold gates 910 during operation.

Injection molding apparatus 900 includes thermocouple 928 for monitoring and controlling first and second nozzle heaters 926, 938, respectively. During operation, thermal expansion in an axial direction of manifold 918 and first and second nozzles 902, 903 is accommodated by having upstream end 931 of manifold nozzle link 934 in a sliding/ telescopic arrangement within manifold melt channel 932. Axial thermal expansion of first nozzle 902 and second nozzle 903 is restricted in a direction of mold cavities 912 by locator 940, such that thermal expansion of first and second nozzles 902, 903 occurs substantially in the direction of arrow AE in FIG. 9. Consequently, two-piece nozzle seals 916 do not bear the load of both manifold 918 and first and second nozzles 901, 903 during operation of injection molding apparatus 900.

All other features of injection molding apparatus 900 that are shown in FIG. 9 but not particularly described with respect to injection molding apparatus 900 are similar to the same or similar features shown and described with reference to previous embodiments of the present invention.

Figure 10:
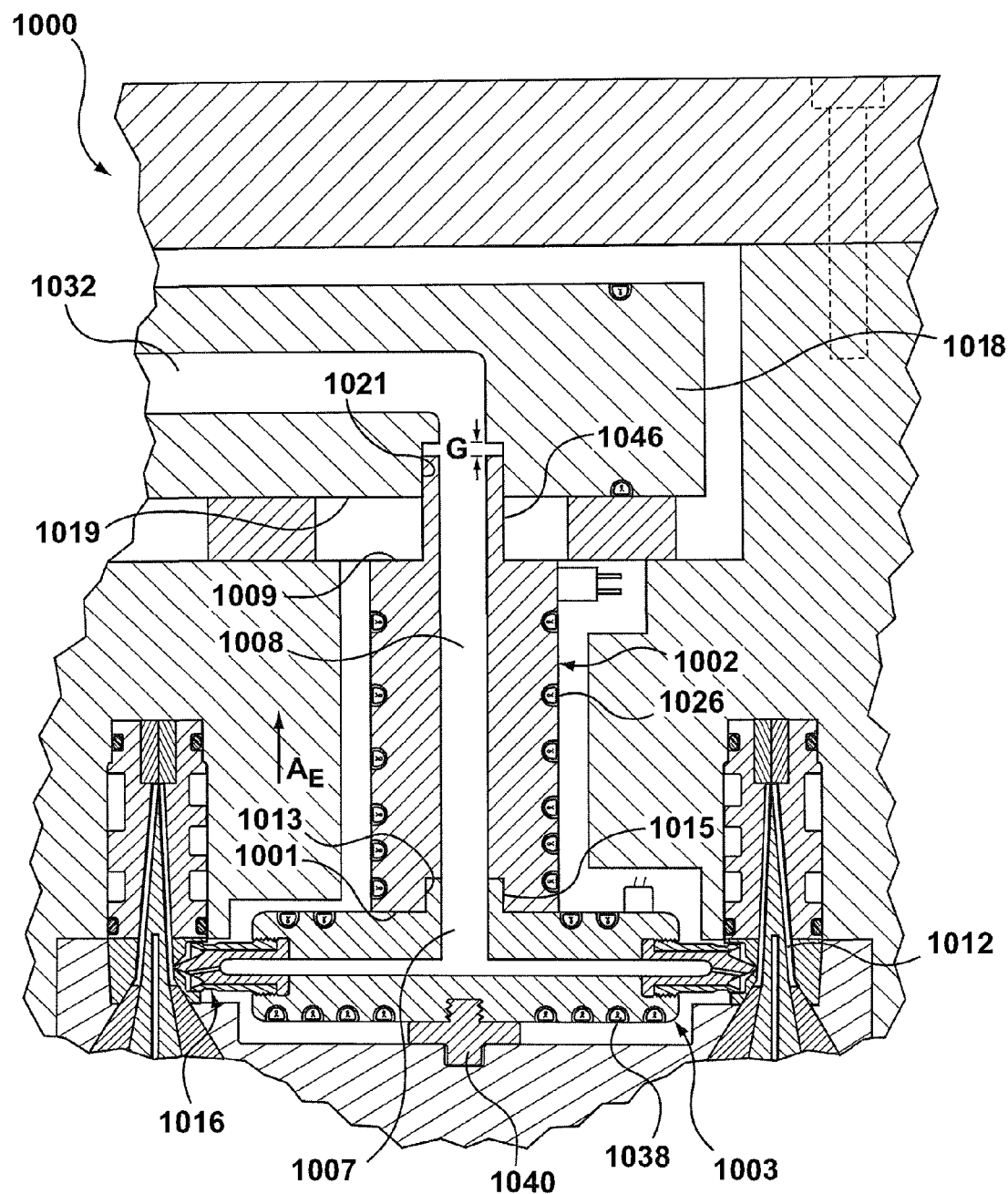
FIG. 10 is a cross-sectional view of an injection molding apparatus according to another embodiment of the present invention.

FIG. 10 is a cross-sectional view of an injection molding apparatus 1000 according to another embodiment of the present invention. Injection molding apparatus 1000 includes first nozzle 1002 having first nozzle melt channel 1008 and second nozzle 1003 having second nozzle melt channel 1007. However, as in the embodiment of FIG. 7, first and second nozzles 1002, 1003 may be considered a two-part nozzle having first and second nozzle portions 1002, 1003 without departing from the scope of the present invention.

Downstream end 1001 of first nozzle 1002 includes bore 1013 for receiving a tubular projection 1015 of second nozzle 1003, which permits second nozzle 1003 to be permanently coupled to first nozzle 1002, such as by brazing, soldering, or shrink fitting, or removably coupled to first nozzle 1002, such as by press fitting. When first and second nozzles 1002, 1003 are in engagement with one and other, first nozzle melt channel 1008 is in fluid communication with second nozzle melt channel 1007. A tubular projection 1046 extends from upstream end 1009 of first nozzle 1002 and is of a length sufficient to bridge a space or distance between upstream end 1009 of nozzle 1002 and manifold 1018.

Manifold 1018 includes manifold melt channel 1032 for receiving a melt stream of moldable material from a melt source (not shown) and delivering the melt stream to first nozzle melt channel 1008. Downstream surface 1019 of manifold 1018 includes bore 1021 for slidably receiving tubular projection 1046 of first nozzle 1002. In FIG. 10, injection molding system 1000 is shown in a non-operating, cold condition with a gap "G" shown between the upstream surface of tubular projection 1046 and an opposing surface of manifold bore 1021.

Injection molding apparatus 1000 includes independent first and second nozzle heaters 1026, 1038 that are wound around first and second nozzles 1002, 1003 respectively. Heaters 1026, 1038 may be operated by a single thermocouple, as in the embodiment of FIG. 2, or by a dedicated thermocouple for each, as shown in the embodiment of FIG. 3. During operation, thermal expansion in an axial direction of manifold 1018 and first and second nozzles 1002, 1003 is accommodated by gap "G" between tubular projection 1046 of first nozzle 1002 and manifold bore 1021. In such an arrangement, requisite axial thermal expansion is accommodated by having a sliding/telescopic arrangement between tubular projection 1046 of first nozzle 1002 and manifold bore 1021. Consequently, since axial thermal expansion of first nozzle 1002 and second nozzle 1003 is restricted in a direction of mold cavities 1012 by locator 1040, nozzle seals 1016 do not bear the load of both manifold 1018 and first and second nozzles 1001, 1003 during operation of injection molding apparatus 1000.

All other features of injection molding apparatus 1000 that are shown in FIG. 10 but not particularly described with respect to injection molding apparatus 1000 are similar to the same or similar features shown and described with reference to previous embodiments of the present invention.

Figure 11:
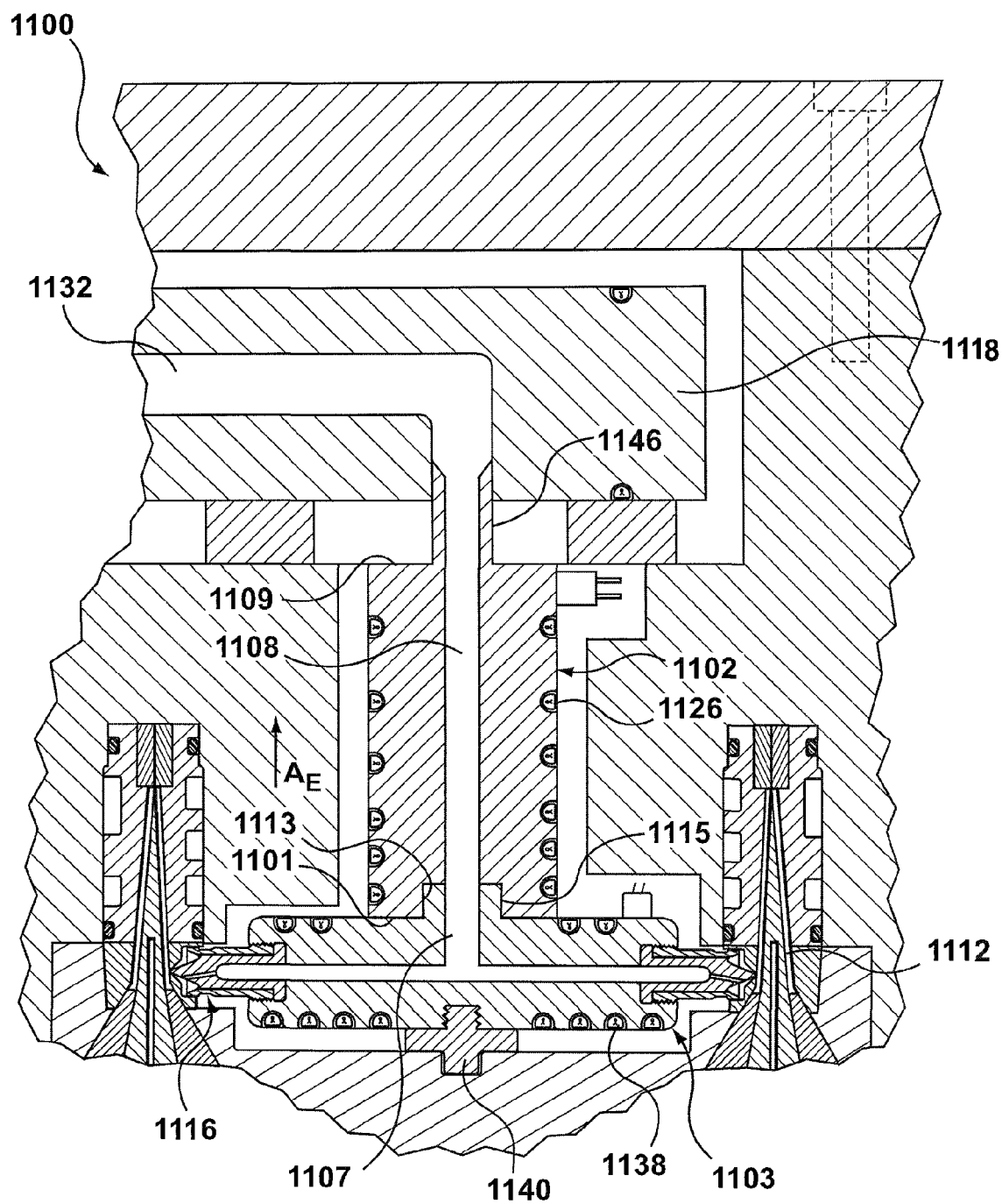
FIG. 11 is a cross-sectional view of an injection molding apparatus according to another embodiment of the present invention.

FIG. 11 is a cross-sectional view of an injection molding apparatus 1100 according to another embodiment of the present invention. Injection molding apparatus 1100 includes first nozzle 1102 having first nozzle melt channel 1108 and second nozzle 1103 having second nozzle melt channel 1107. However, as in the embodiment of FIG. 7, first and second nozzles 1102, 1103 may be considered a two-part nozzle having first and second nozzle portions 1102, 1103 without departing from the scope of the present invention.

Downstream end 1101 of first nozzle 1102 includes bore 1113. Bore 1113 in downstream end 1101 of first nozzle 1102 slidably receives tubular projection 1115 of second nozzle 1103 to permit second nozzle 1103 to be permanently coupled, i.e., fixed or rigidly attached, to first nozzle 1102, such as by brazing, soldering, or shrink fitting, or removably coupled to first nozzle 1102, such as by press fitting. When first and second nozzles 1102, 1103 are in engagement with one and other, first nozzle melt channel 1108 is in fluid communication with second nozzle melt channel 1107. A tubular projection 1146 extends from upstream end 1109 of first nozzle 1102 and is of a length sufficient to bridge a space or distance between upstream end 1109 of nozzle 1102 and manifold 1118.

Manifold 1118 includes manifold melt channel 1132 for receiving a melt stream of moldable material from a melt source (not shown) and delivering the melt stream to first nozzle melt channel 1108. Tubular projection 1146 is slidingly received within manifold melt channel 1132.

Injection molding apparatus 1100 includes independent first and second nozzle heaters 1126, 1138 that are wound around first and second nozzles 1102, 1103 respectively. Heaters 1126, 1138 may be operated by a single thermocouple, as in the embodiment of FIG. 2, or by a dedicated thermocouple for each, as shown in the embodiment of FIG. 3. During operation, thermal expansion in an axial direction of manifold 1118 and first and second nozzles 1102, 1103 is accommodated by having tubular projection 1146 of first nozzle 1102 in a sliding/telescopic arrangement within manifold melt channel 1132. Axial thermal expansion of first nozzle 1102 and second nozzle 1103 is restricted in a direction of mold cavities 1112 by locator 1140. Consequently, nozzle seals 1116 alone do not bear the load of both manifold 1118 and first and second nozzles 1101, 1103 during operation of injection molding apparatus 1100.

All other features of injection molding apparatus 1100 that are shown in FIG. 11 but not particularly described with respect to injection molding apparatus 1100 are similar to the same or similar features shown and described with reference to previous embodiments of the present invention.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

The invention claimed is:

1. An injection molding system comprising:
a manifold having a melt channel for receiving a melt stream of moldable material;
a front-mountable nozzle having a melt channel in fluid communication with the manifold melt channel, the nozzle being disposed within an opening in a mold plate and having a plurality of nozzle tips radially extending from a downstream end, wherein each nozzle tip is in fluid communication with a respective mold cavity and wherein the nozzle only makes contact with the mold plate via a locator device positioned between a downstream surface of the nozzle and the mold plate, the locator device being of a height to align each nozzle tip with the respective mold cavity;
a tubular connector device having a melt channel for receiving the melt stream from the manifold melt channel and delivering the melt stream to the nozzle melt channel, the tubular connector device having a first end within a downstream bore in the manifold and having a second end within an upstream bore in the nozzle and being of a length that bridges a space between the manifold and nozzle, wherein one of the first and second ends of the tubular connector is threaded; and
a spacer member positioned between a downstream surface of the manifold and an upstream surface of the mold plate that maintains the space between the manifold and the nozzle such that the manifold and nozzle do not touch in operating and non-operating conditions.

2. The injection molding system of claim 1, wherein the first end of the tubular connector device is threadably engaged with a downstream bore in the manifold bore and the second end of the tubular connector device is slidable within an upstream bore in the nozzle.

3. The injection molding system of claim 2, wherein an annular seal is disposed within the nozzle bore for slidably receiving the tubular connector device.

4. The injection molding system of claim 2, wherein a gap exists between the second end of the tubular connector and an opposing surface of the nozzle bore in the cold condition.

5. The injection molding system of claim 4, wherein the nozzle tips are axial fixed in position such that under operating conditions thermal expansion of the nozzle is accommodated by the gap.

6. The injection molding system of claim 1, wherein the first end of the tubular connector device is brazed within a downstream bore of the manifold.

7. The injection molding system of claim 1, wherein the nozzle includes a nozzle body having an upper cylindrical portion and a lower portion that radially extends from the cylindrical portion.

8. The injection molding system of claim 7, further comprising:
a nozzle heater surrounding the upper and lower portions of the nozzle body.

9. The injection molding system of claim 7, further comprising:
a first nozzle heater surrounding the upper portion of the nozzle body; and
a second nozzle heater surrounding the lower portion of the nozzle body.

10. The injection molding system of claim 7, further comprising:
a nozzle heater surrounding the lower portion of the nozzle body.

11. The injection molding system of claim 1, wherein the nozzle is comprised of a first nozzle portion having a first melt channel and a second nozzle portion having a second melt channel.

12. The injection molding system of claim 11, wherein the first and second nozzle portions are threadably connected.

13. The injection molding system of claim 11, wherein the first and second nozzle portions are attached by at least one of a press fit, a shrink fit, a brazed connection and a soldered connection.

14. The injection molding system of claim 11, further comprising:
a first heater for heating the melt stream within the first melt channel; and
a second heater for heating the melt stream within the second melt channel.

15. An injection molding system comprising:
a manifold having a melt channel for receiving a melt stream of moldable material;
a front-mountable nozzle having a melt channel in fluid communication with the manifold melt channel, the nozzle being disposed within an opening in a mold plate and having a plurality of nozzle tips radially extending from a downstream end, wherein each nozzle tip is in fluid communication with a respective mold cavity and wherein the nozzle only makes contact with the mold plate via a locator device position between a downstream surface of the nozzle and the mold plate, the locator device being of a height to align each nozzle tip with the respective mold cavity;
a tubular connector device having a melt channel for receiving the melt stream from the manifold melt channel and delivering the melt stream to the nozzle melt channel, the tubular connector device having a first end received within the manifold and having a second end received within the nozzle and being of a length that bridges a space between the manifold and nozzle, wherein one of the ends of the tubular connector device is slidable within one of the manifold and nozzle melt channels; and
a spacer member positioned between a downstream surface of the manifold and an upstream surface of the mold plate that maintains the space between the manifold and the nozzle such that the manifold and nozzle do not touch in operating and non-operating conditions.

16. The injection molding system of claim 15, wherein the second end is threadably attached within an upstream bore of the nozzle.

17. The injection molding system of claim 15, wherein the second end is brazed within an upstream bore of the nozzle.

18. The injection molding system of claim 15, wherein the nozzle is comprised of a first nozzle portion having a first melt channel and a second nozzle portion having a second melt channel.

19. The injection molding system of claim 18, wherein the first and second nozzle portions are threadably connected.

20. The injection molding system of claim 18, wherein the first and second nozzle portions are attached by at least one of a press fit, a shrink fit, a brazed connection and a soldered connection.

21. The injection molding system of claim 18, further comprising:
a first heater for heating the melt stream within the first melt channel; and
a second heater for heating the melt stream within the second melt channel.

22. An injection molding system comprising:
a manifold having a melt channel for receiving a melt stream of moldable material;
a front-mountable nozzle having a melt channel in fluid communication with the manifold melt channel and a plurality of nozzle tips radially extending from a downstream end such that each nozzle tip is in fluid communication with a respective mold cavity, the nozzle being disposed within an opening in a mold plate and having a tubular projection extending from an upstream surface of the nozzle, wherein the tubular projection of the nozzle is slidably received within the manifold and is of a length that bridges a space between the manifold and the nozzle, and wherein the nozzle only makes contact with the mold plate via a locator device positioned between a downstream surface of the nozzle and the mold plate, the locator device being of a height to align each nozzle tip with the respective mold cavity; and
a spacer member positioned between a downstream surface of the manifold and an upstream surface of the mold plate that maintains the space between the manifold and the nozzle such that the only contact between the manifold and the nozzle is via the tubular projection of the nozzle.

23. The injection molding system of claim 22, wherein the tubular projection is slidable within a bore in a downstream surface of the manifold.

24. The injection molding system of claim 23, wherein a gap exists between an end of the tubular projection and an opposing surface of the manifold bore in the cold condition.

25. The injection molding system of claim 22, wherein the nozzle is comprised of a first nozzle having a first nozzle melt channel and a second nozzle having a second nozzle melt channel.

26. The injection molding system of claim 25, wherein the first and second nozzles are threadably connected.

27. The injection molding system of claim 26, wherein the first and second nozzles are attached by at least one of a press fit, a shrink fit, a brazed connection and a soldered connection.

28. The injection molding system of claim 25, further comprising:
a first nozzle heater for heating the melt stream within the first nozzle melt channel; and
a second nozzle heater for heating the melt stream within the second nozzle melt channel.

* * * * *

UNITED STATES PATENT AND TRADEMARK OFFICE
CERTIFICATE OF CORRECTION

PATENT NO.        : 7,614,869 B2
APPLICATION NO.   : 11/746054
DATED             : November 10, 2009
INVENTOR(S)       : Denis Babin et al.

It is certified that error appears in the above-identified patent and that said Letters Patent is hereby corrected as shown below:

In column 12, claim 1, line 4, replace "front-mountable" with -- front-mounted --.
In column 12, claim 1, lines 10-11, delete "wherein the nozzle only makes contact with the mold plate via".
In column 12, claim 1, line 11, after "locator device positioned" insert -- downstream of the nozzle tips --.
In column 12, claim 1, line 19, replace "within a downstream bore in" with -- that is fixed to and moves in unison with --.
In column 12, claim 1, line 20, after "second end" insert -- that slides --.
In column 12, claim 1, line 20, delete "an upstream bore in".
In column 12, claim 1, line 20, after "nozzle" insert -- melt channel --.
In column 12, claim 1, lines 22-23, replace "one of the first and second ends of the tubular connector is threaded" with -- under operating conditions axial thermal expansion of the nozzle and the manifold is restricted in a direction of the mold cavities by the locator device such that axial thermal expansion of the nozzle and the manifold is accommodated by the second end of the tubular connector device sliding within the nozzle melt channel --.
In column 12, claim 1, line 28, replace "in" with -- each other under --.
In column 13, claim 15, lines 10-11, delete "wherein the nozzle only makes contact with the mold plate via".
In column 13, claim 15, line 11, replace "position" with -- positioned downstream of the nozzle tips --.
In column 13, claim 15, line 19, replace "received" with -- that slides --.
In column 13, claim 15, line 19, after "manifold" insert -- melt channel --.
In column 13, claim 15, line 20, replace "received within" with -- that is fixed to and moves in unison with --.
In column 13, claim 15, lines 22-24, replace "one of the ends of the tubular connector device is slidable within one of the manifold and nozzle melt channels" with -- under operating conditions axial thermal expansion of the nozzle and the manifold is restricted in a direction of the mold cavities by the locator device such that axial thermal expansion of the nozzle and the manifold is accommodated by the first end of the tubular connector device sliding within the manifold melt channel --.
In column 13, claim 15, line 29, replace "in" with -- each other under --.
In column 14, claim 22, line 12, after "manifold" insert -- melt channel --.
In column 14, claim 22, lines 14-15, delete "wherein the nozzle only makes contact with the mold plate via".
In column 14, claim 22, line 15, after "locator device positioned" insert -- downstream of the nozzle tips --.

CERTIFICATE OF CORRECTION (continued)

U.S. Pat. No. 7,614,869 B2

In column 14, claim 22, line 18, after "cavity" insert -- wherein under operating conditions axial thermal expansion of the nozzle and the manifold is restricted in a direction of the mold cavities by the locator device such that axial thermal expansion of the nozzle and the manifold is accommodated by the tubular projection of the nozzle sliding within the manifold melt channel --.

Signed and Sealed this

Sixteenth Day of March, 2010

David J. Kappos
*Director of the United States Patent and Trademark Office*